United States Patent
Flores Sandoval et al.

(10) Patent No.: US 11,261,282 B2
(45) Date of Patent: Mar. 1, 2022

(54) PEO-PPO-PEO TRIBLOCK BIPOLYMERS, WITH AMPHOTERIC ENDINGS, AS DEMULSIFYING AGENTS FOR HEAVY CRUDE OILS

(71) Applicant: INSTITUTO MEXICANO DEL PETROLEO, Mexico City (MX)

(72) Inventors: Cesar Andres Flores Sandoval, Mexico City (MX); Flavio Salvador Vazquez Moreno, Mexico City (MX); Alfonso Lopez Ortega, Mexico City (MX); Fernando Alvarez Ramirez, Mexico City (MX); Gerardo Zavala Olivares, Mexico City (MX); Jessica Valeria Fuentes Santiago, Mexico City (MX); Edgar Benedicto Zamora Guerrero, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 28 days.

(21) Appl. No.: 16/865,033

(22) Filed: May 1, 2020

(65) Prior Publication Data

US 2020/0347173 A1 Nov. 5, 2020

(30) Foreign Application Priority Data

May 2, 2019 (MX) ............... MX/a/2019/005132

(51) Int. Cl.
*C08F 299/02* (2006.01)
*C10G 33/04* (2006.01)
*C08L 53/00* (2006.01)

(52) U.S. Cl.
CPC .......... *C08F 299/02* (2013.01); *C08L 53/005* (2013.01); *C10G 33/04* (2013.01)

(58) Field of Classification Search
CPC ............................ C08F 299/02; C08G 65/00
See application file for complete search history.

(56) References Cited

U.S. PATENT DOCUMENTS

| | | | |
|---|---|---|---|
| 2,425,845 A | 8/1947 | Toussaint et al. | |
| 3,334,038 A | 8/1967 | Lucas | |
| 8,518,868 B2 * | 8/2013 | Hernandez Altamirano | C23F 11/173 510/479 |
| 8,815,960 B2 | 8/2014 | Cendejas Santana et al. | |
| 9,023,785 B2 | 5/2015 | Hernandez Altamirano et al. | |
| 9,587,182 B2 | 3/2017 | Flores Oropeza et al. | |
| 9,650,577 B2 | 5/2017 | Flores Oropeza et al. | |
| 9,745,521 B2 | 8/2017 | Flores Oropeza et al. | |
| 9,752,084 B2 | 9/2017 | Flores Oropeza et al. | |
| 10,125,226 B2 | 11/2018 | Flores Sandoval et al. | |
| 2014/0238901 A1 * | 8/2014 | Flores Oropeza | C08L 71/02 208/188 |

FOREIGN PATENT DOCUMENTS

CA 2970268 6/2016

OTHER PUBLICATIONS

Hernández, A., "Síntesis, caracterización y evaluación de copolímeros en bloques para el deshidratado de aceites crudos mexicanos" Tesis I.Q.I., ESIQIE, IPN, (2008), p. 2, 20-22,40-47.
J. Wu, Y. Xu, T. Dabros and H. Hamza (2005). Effect of EO and PO positions in nonionic surfactants on surfactant properties and demulsification performance. Colloids Surf. A: Physicochem. Eng. Aspect. 252, 79.

* cited by examiner

*Primary Examiner* — Marks S Kaucher
(74) *Attorney, Agent, or Firm* — Jason P. Mueller; FisherBroyles, LLP

(57) ABSTRACT

Disclosed are chemical products useful for crude oil conditioning, particularly to demulsifying basic compounds. Disclosed are $PEO_w$-$PPO_y$-$PEO_w$ triblock bipolymers, with amphoteric groups, β-amino acid derivatives, at the chain ends, which destabilize water-in-crude oil (W/O) emulsions, thereby removing emulsified water and salts dissolved salts in the aforementioned phase.

13 Claims, 7 Drawing Sheets

PEO-PPO-PEO TRIBLOCK BIPOLYMERS, WITH AMPHOTERIC ENDINGS, AS DEMULSIFYING AGENTS FOR HEAVY CRUDE OILS

This application claims priority to Mexico Patent Application No. MX/a/2019/005132, filed May 2, 2019, the entire contents of which is incorporated herein by reference.

TECHNICAL FIELD

The present disclosure relates to chemical products useful for crude oil conditioning, particularly to demulsifying basic compounds. It concerns to the implementation of $PEO_w$-$PPO_y$-$PEO_w$ triblock bipolymers, with amphoteric groups, β-amino acid derivatives, at the chain ends, to destabilize water-in-crude oil (W/O) emulsions, with the aim of removing emulsified water and salts dissolved salts in the aforementioned phase. These emulsions must be removed from crude oils having API densities from 3 to 40° API, conditioned in triphasic separation units.

BACKGROUND OF THE DISCLOSURE

Currently, the crude oils that are extracted are mainly heavy and extra heavy (lower API density), in which a hig content of water and salts are present, The water present is in the form of an emulsion, which is stabilized by the high content of natural surfactants, such as resins and asphaltenes. The presence of water and salts in crude oil is a serious problem in the petroleum industry, because it causes significant corrosion problems in pipes and equipment. The addition of chemical agents, so-called demulsifying agents, is a method widely used at the industrial level to induce the destabilization of water-in-crude oil emulsions.

There is a great variety of chemical products that have been evaluated as demulsifying agents of crude oil [1]; yet, triblock bipolymers of type PEO-PPO-PEO are the most widely employed in petroleum industry [2-4].

Nevertheless, those polyethers present some drawbacks on their use as demulsifying agents: 1) these basic compounds are applied as a formulation of at least three triblock polyethers of different molecular mass and composition, as well as, 2) they present chemical instability under acidic conditions. In addition, the production of ethylene oxide has decreased in some countries, which leads, invariably, to a higher cost of the final product.

In order to avoid the chemical degradation of the hydroxyl ending groups in the $PEO_w$-$PPO_y$-$PEO_w$ bipolymer, the functionalization of these ending groups was carried out, with the aim of obtaining fragments resistant to acid conditions.

Related to similar polyethers, U.S. Pat. No. 8,815,960 discloses the synthesis of $PEO_w$-$PPO_y$-$PEO_w$ triblock bipolymers, functionalized with secondary amines and their use as demulsifying agents of heavy crude oils [5]. It is shown in this document that functionalized triblock bipolymers display an excellent performance to remove emulsified water.

In a similar way, the performance of formulations of triblock bipolymers functionalized with secondary amines and ionic liquids as dehydrating and desalting agents of medium, heavy, and extra-heavy crude oils was evaluated, respectively, in U.S. Pat. Nos. 9,587,182 and 9,650,577 [6-7]. Even though the performance of both formulations was good, there is the drawback of using ionic liquids, which increases the cost of their evaluated formulation.

It has also been reported that $PEO_w$-$PPO_y$-$PEO_w$ triblock bipolymers were functionalized with tertiary amines, in order to obtain a quaternary amine at the endings of the bipolymer chains, as mentioned in the U.S. Pat. Nos. 9,745,521 and 9,752,084 [8,9]. The bipolymers functionalized with tertiary amines presented a good performance for the dehydration and desalting of crude oils with API densities from 14 to 23° API.

U.S. Pat. No. 10,125,226 describes the synthesis procedure for the scaling-up from 1 to 100 L of the formulation of triblock bipolymers functionalized with secondary and tertiary amines [10]. The formulation of such bipolymers exhibited a good performance when used to dehydrate and desalt heavy crude oils.

On the other hand, the U.S. Pat. No. 8,518,868 refers to the synthesis of geminal surfactants, that are derivatives of bis-N-alkyl polyethers, bis-N-alkenyl polyethers, bis-N-cycloalkyl polyethers, bis-N-aryl polyether bis-beta or alpha-amino acids or their salts, and their use as corrosion inhibitors in pipes and equipment for transportation of crude oil and liquid fuels [11]. The authors report that the functionalization is carried out on homopolymers of ethylene or propylene oxide, to obtain molecular masses of 100 to 20,000 g·mol$^{-1}$, or in bipolymers of these monomers. However, the weight percentage ratio of the ethylene oxide and propylene oxide monomers in the bipolymer chains and when the bipolymers possess a diblock or a triblock their structures were not reported. Furthermore, the authors mention that the geminal surfactants should be soluble in water, brine or in organic solvents. Finally, only the functionalization and the use as corrosion inhibitor of an ethylene oxide homopolymer of specific molecular mass is given in the described examples.

The Patent Application CA 2970268 describes the use of a homopolymer of ethylene oxide with geminal functionalization with hydroxysultaine or sulfobetaine. The obtained zwitterionic liquid (so-called by the authors) was employed as wettability modifier of rocks such as limestone, dolomite, sandstone or heterogeneous lithologies [12].

The present disclosure relates to the synthesis of $PEO_w$-$PPO_y$-$PEO_w$ triblock bipolymers functionalized with amphoteric terminal groups. Firstly, $PEO_w$-$PPO_y$-$PEO_w$ triblock bipolymers were functionalized with secondary amines, according to the procedure described in U.S. Pat. No. 10,125,226. Subsequently, a di-amphoteric compound is obtained by the functionalization of the amine ending groups of the triblock bipolymer with an acrylic derivative. The triblock bipolymer with amphoteric ending groups was assessed as demulsifying agent of heavy and extra-heavy crude oils, showing a good performance for the removal of emulsified water, better than that of the commercial formulations based on conventional $PEO_w$-$PPO_y$-$PEO_w$ triblock bipolymers without functionalization.

BRIEF DESCRIPTION OF THE DRAWINGS

FIG. 1 discloses the performance of triblock polymers as demulsifying agents biopolymers. Triblock polymers without functionalization (CSF), functionalized triblock bipolymers with secondary amine—diethanolamine—(C-DEA), and the amphoteric triblock bipolymers, functionalized with acrylic acid (C-AA), methacrylic acid (C-AMA), and with 2-carboxyethyl acrylate (C-2CEA), tested in an extra-heavy crude oil of 7.55° API (Kawil-1), at a dosage of 1500 ppm. The compounds were compared with the FDH-1 commercial formulation and with the crude oil without treatment (blank).

FIG. 2 discloses the performance as demulsifying agents of the CSF, C-DEA, C-AA, C-AMA, and C-2CEA bipolymers, and the FDH-1 commercial formulation, tested in an extra-heavy crude oil of 7.55° API (Kawil-1), at a dosage of 1000 ppm. The performance of the products was contrasted with the behavior of the crude oil without chemical treatment (blank).

FIG. 3 discloses the performance as demulsifying agents of the CSF, C-DEA, C-AA, C-AMA, and C-2CEA bipolymers, and the FDH-1 commercial formulation, tested in an extra-heavy crude oil of 7.55° API (Kawil-1), at a dosage of 500 ppm. The performance of the products was compared with the behavior of the crude oil without chemical treatment (blank).

FIG. 4 discloses the performance as demulsifying agents of the CSF, C-DEA, C-AA, C-AMA, and C-2CEA bipolymers and the FDH-1 commercial formulation, tested in an extra-heavy crude oil of 7.55° API (Kawil-1), at a dosage of 250 ppm. The performance of the products was contrasted with the behavior of the crude oil without chemical treatment (blank).

FIG. 5 discloses the performance as demulsifying agents of the CSF, C-DEA, C-AA, C-AMA, and C-2CEA bipolymers, and the FDH-1 commercial formulation, tested in a heavy crude oil of 11.23° API (Kawil-2), at a dosage of 1500 ppm. The performance of the products was compared with the behavior of the crude oil without chemical treatment (blank).

FIG. 6 discloses the performance as demulsifying agents of the CSF, C-DEA, C-AA, C-AMA, and C-2CEA bipolymers, and the FDH-1 commercial formulation, tested in a heavy crude oil of 11.23° API (Kawil-2), at a dosage of 1000 ppm. The performance of the products was contrasted with the behavior of the crude oil without chemical treatment (blank).

FIG. 7 discloses the performance as demulsifying agents of the CSF, C-DEA, C-AA, C-AMA, and C-2CEA bipolymers, and the FDH-1 commercial formulation, tested in a heavy crude oil of 11.23° API (Kawil-2), at a dosage of 500 ppm. The performance of the products was compared with the behavior of the crude oil without chemical treatment (blank).

SUMMARY OF THE INVENTION

Figure 1:
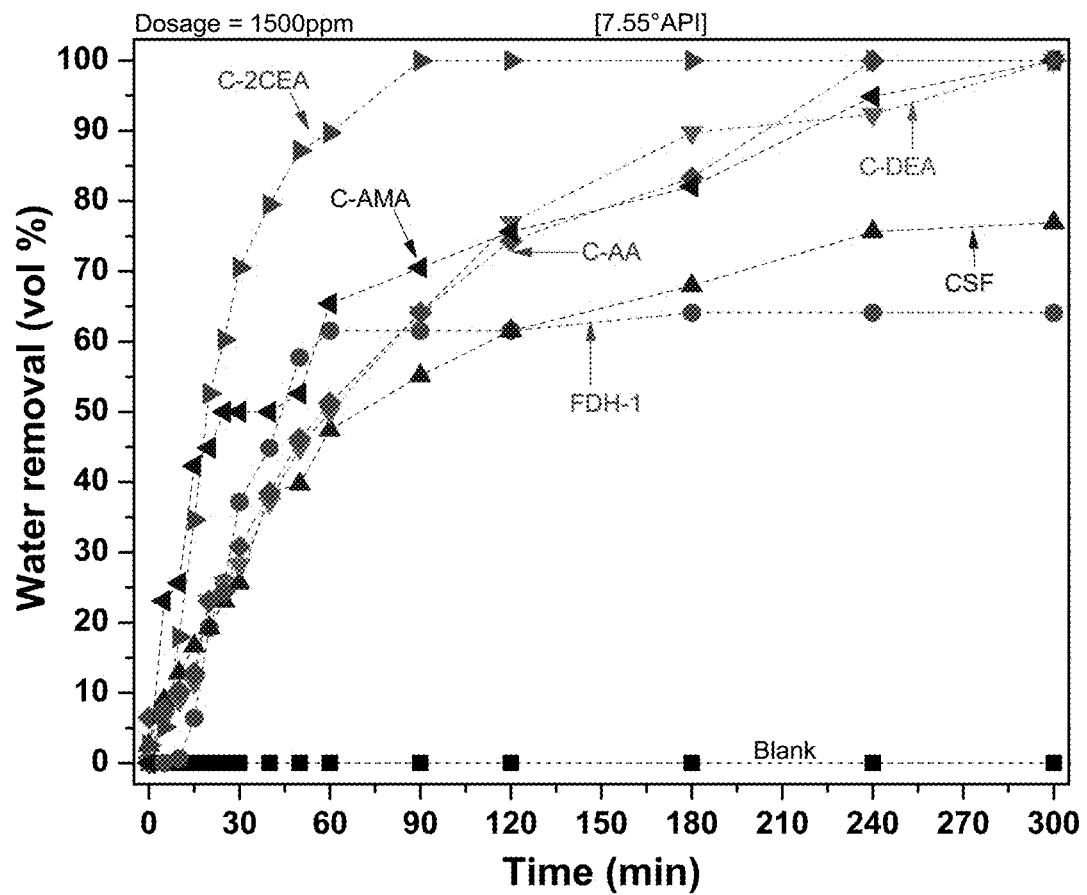
FIGS. 1 to 7 display the performance as demulsifying agents of the $PEO_w$-$PPO_y$-$PEO_w$ triblock bipolymers without functionalization, functionalized with a secondary amine, and with different amphoteric endings dosed at 1500, 1000, 500, and 250 ppm in an extra-heavy crude oil of 7.55° API (Kawil-1).

Nowadays, petroleum industry faces the problem that commercial demulsifying agents show low efficiencies to remove emulsified water and salts from produced crude oils. This one is very often due to the chemical degradation that demulsifiers suffer as consequence of wells acid stimulations. A technical alternative proposed to solve this problem is the functionalization of the hydroxyl groups at the end of $PEO_w$-$PPO_y$-$PEO_w$ triblock bipolymers. This chemical modification was performed, firstly, as a functionalization with secondary amines [10] and, subsequently, adding an acrylic derivative with the aim of obtaining an amphoteric compound. These new triblock bipolymers with amphoteric endings were evaluated as demulsifying agents of crude oils with API densities between 3 and 40° API, displaying a performance greater than those of a non-functionalized $PEO_w$-$PPO_y$-$PEO_w$ triblock bipolymer and a commercial demulsifying formulation. In this way, it has been demonstrated that the water removal efficiency considerably increases when the $PEO_w$-$PPO_y$-$PEO_w$ triblock bipolymers are grafted with amphoteric endings. It should be denoted that bipolymers functionalized with amphoteric groups are also able to induce a homogeneous breakdown of the crude oil and aqueous phases, showing a greater clarifying capacity of the removed water than that of the commercial formulation. Finally, it must be remarked that the new triblock bipolymers grafted with amphoteric endings are resistant to chemical degradation under acid conditions.

DETAILED DESCRIPTION

The present disclosure relates to the synthesis of $PEO_w$-$PPO_y$-$PEO_w$ triblock bipolymers with amphoteric ending groups, which have been tested as demulsifying agents in crude oils with API densities within the interval of 3 to 40° API.

The following is a non-limiting example off a procedure for synthesizing triblock biopolymers having amphoteric ending groups. The first step is the preparation of a functionalized triblock biopolymer comprising a secondary amine according to the method described in the U.S. Pat. No. 10,125,226. This patent describes a two-stage synthesis, which is briefly described as follows:

Step 1. Preparation of the a,w-dialkylsulfonylester or a,w-diarylsulfonylester of poly(ethylene oxide)$_w$-poly(propylene oxide)$_y$-poly(ethylene oxide)$_w$, wherein an alkyl sulfonyl or aryl sulfonyl chloride is reacted with the poly(ethylene oxide)$_w$-poly(propylene oxide)$_y$-poly(ethylene oxide)$_w$ triblock bipolymer. The average molecular mass in number of $PEO_w$-$PPO_y$-$PEO_w$ bipolymer is between the range from 600 to 10,000 g/mol; where the "w" subscript is an integer from 4 to 90; whereas the "y" subscript is is an integer from 6 to 104.

Step 2. The nucleophilic substitution reaction was carried out with the α,ω-dialkylsulfonylester or α,ω-diarylsulfonylester and the poly(ethylene oxide)$_w$-poly(propylene oxide)$_y$-polyethylene oxide)$_w$ with secondary amines to obtain the functionalized bipolymers Y-$PEO_w$-$PPO_y$-$PEO_w$-Y (Y=secondary amine).

Once the functionalized bipolymer truncated with secondary amines was synthesized, it was reacted with acrylic acid derivatives via a Michael addition, to obtain a biopolymer having amphoteric end capping units, as shown in scheme (1). In scheme (1) is observed that the nitrogen atom bears a positive formal charge; while the negative formal charge is centered in the oxygen atom of the ester moiety (if $R_4$=H) or in the terminal oxygen of the radical fragment $R_4$ (if $R_4 \neq$H).

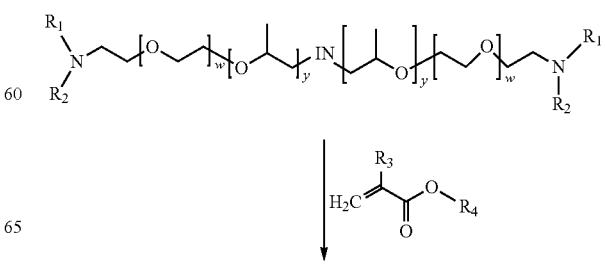

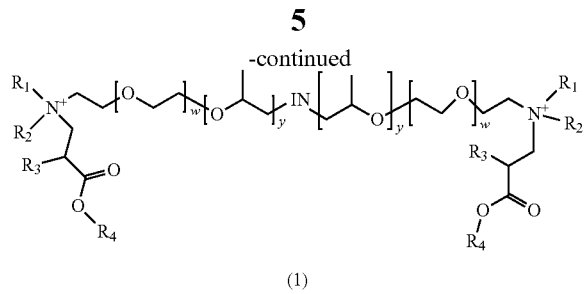

(1)

The Michael addition was carried out by dissolving the functionalized bipolymer having a secondary amine end cap in an organic solvent, having a boiling point from 40 to 130° C., for example, methanol, ethanol, isopropanol, chloroform, benzene, toluene or xylene, or mixtures thereof. The molar ratio of the functionalized bipolymer with secondary amine/acrylic derivative was from 1.0/2.0 to 1.0/3.0. The acrylate derivative was added under starving feed conditions, at a mass flow rate within 1 and 50 g (L·min)$^{-1}$. The reaction temperature was from 50 to 120° C.; while the reaction time was from 2 to 8 hours, after which the solvent is removed at a temperature from 80 to 130° C.

PEO$_w$-PPO$_y$-PEO$_w$ triblock bipolymers with amphoteric endings, having an average molecular number weight were obtained that had a mass of from 600 to 10,000 g/mol. Examples of these biopolymers, are illustrated by the structural formulas (2) and (3).

EGJ are independent radicals represented by: —H, -methyl, ethyl, n-propyl, iso-propyl, sec-butyl, iso-butyl, tert-butyl, n-butyl, phenyl, cyclohexyl, or cyclopentyl.

L is a radical represented by methyl and ethyl, and M is a hydroxyl group.

Q is an integer from 1 to 5; T is represented by the groups: EGJ and NO$_2$, Cl, F, Br.

R$_3$=H (hydrogen), CH$_3$ (methyl), and methoxide (CH$_3$OCH2O).

R$_4$=H (hydrogen), CH$_3$ (methyl), C$_3$H$_5$O$_2$ (carboxyethyl), C$_4$H$_7$O$_2$ (carboxypropyl) and C$_5$H$_9$O$_2$ (carboxybutyl), C$_2$H$_4$O (ethoxy), or C$_4$H$_8$O (butoxy), U is an integer from 1 to 2.

X is oxygen or a nitrogen atom; with the proviso that when X=nitrogen then V is represented by methyl, ethyl, n-propyl, iso-propyl, sec-butyl, iso-butyl, tert-butyl, n-butyl, phenyl, cyclohexyl, cyclopentyl or benzyl.

Z represents a mono- or di-substitution at any ring position of 5- or 6-member rings, chosen from methyl, ethyl, n-propyl, iso-propyl, sec-butyl, iso-butyl, tert-butyl, n-butyl, phenyl, cyclohexyl, cyclopentyl, benzyl or hydroxyl.

w is an integer from 4 to 90.

y is an integer from 6 to 104.

Non-limiting examples of monomers suitable for use in preparing the disclosed triblock bipolymers having amphoteric endings include: 2-carboxyethyl acrylate, 3-carboxy-

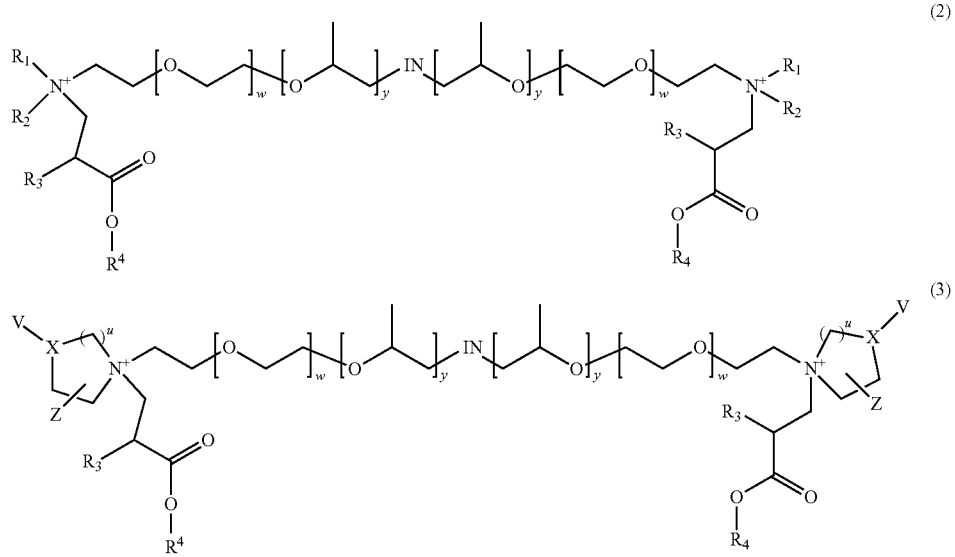

Wherein:

IN=C$_2$H$_4$O$_2$ (ethylene glycollate).

R$_1$ and R$_2$=Independent radicals represented by the following groups:

—H (hydrogen); —CH$_2$(CH$_2$)$_A$B; -CEGJ; —CH$_2$CHLM; —CH$_2$(CH$_2$)$_Q$M;

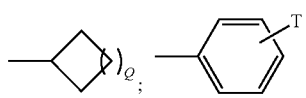

where A is an integer from 1 to 11, B is —H.

propyl acrylate, 4-carboxybutyl acrylate, 2-carboxyethyl methacrylate, 3-carboxypropyl methacrylate, and 4-carboxybutyl methacrylate.

The method consists of adding an effective amount of triblock bipolymer with amphoteric endings to crude oils with API densities from 3 to 40° API, at concentrations within 10 and 2000 ppm, to induce the demulsification of the aforementioned crude oils.

The present invention is described with reference to a specific number of examples, which are considered just as illustrative but not restrictive of the present invention. Once obtained, the triblock bipolymers with amphoteric endings were characterized by the following methods:

1.—Size Exclusion Chromatography (SEC), using an Agilent™ model 1100 chromatograph, with PLgel column, and employing tetrahydrofuran (THF) as eluent to calculate the distribution of molecular masses of the polymers and the polydispersity indexes (l).

2.—Fourier Transform-Infrared Spectroscopy (FTIR), using a Thermo Nicolet™ AVATAR 330 spectrometer and the method of film technique with the software OMNIC™ version 7.0.

3.—$^1$H and $^{13}$C Nuclear Magnetic Resonance (NMR) using a Bruker™ Avance III HD spectrometer, operating at 300 MHz and 75 MHz, respectively, using deuterated chloroform (CDCl$_3$) as solvent and tetramethyl silane (TMS) as reference. In all cases, 70 mg of polymer were dissolved in 0.5 mL of deuterated chloroform.

EXAMPLES

The following examples help illustrate the spectroscopic characteristics of the PEO$_w$-PPO$_y$-PEO$_w$ triblock bipolymers with amphoteric endings used as demulsifying agents of crude oils with API densities within 3 and 40° API. These should not be considered as limitations of what is claimed hereby.

Synthesis of Triblock PEO$_w$-PPO$_y$-PEO$_w$ Bipolymers with Amphoteric Endings

Example 1

1 g of poly(ethylene oxide)$_w$-polypropylene oxide)$_y$-poly(ethylene oxide)$_w$ (PEO$_w$-PPO$_y$-PEO$_w$) triblock bipolymer bifunctionalized with a secondary amine was placed in a 100 mL reactor and subsequently, dissolved using 50 mL of solvent. Then, a carboxyacrylic derivative was added considering a molar ratio of 2.1 mol of the former per mol of bipolymer functionalized with secondary amine. The reaction mixture was heated under reflux for 6 hours. Once the reaction time was over, the mixture was filtered and the solvent was evaporated at reduced pressure, obtaining a viscous liquid.

Example 2

1 g of triblock poly(ethylene oxide)$_w$-poly(propylene oxide)$_y$-poly(ethylene oxide)$_w$ (PEO$_w$-PPO$_y$-PEO$_w$) bipolymer bifunctionalized was dissolved in 50 mL of solvent and placed in a 100 mL reactor equipped with a teflon mechanical stirrer and a temperature-controlled oil bath. A carboxyacrylic derivative was added based on a molar ratio of 3.0 mol of acrylate derivative per mol of the secondary amine functionalized triblock bipolymer The mixture was heated under reflux for 6 hours, after which the mixture was filtered and the solvent removed under reduced pressure to afford the desired product as a viscous liquid.

Example 3

A 50 mL solution containing 1 g of triblock poly(ethylene oxide)$_w$-polypropylene oxide)$_y$-poly(ethylene oxide)$_w$ (PEO$_w$-PPO$_y$-PEO$_w$) bipolymer bifunctionalized with a secondary amine was charged to a 100 mL reactor with a temperature-controlled oil bath and a teflon mechanical stirrer. Afterwards, a carboxyacrylic derivative was added based on a molar ratio of 4.0 mol of carboxyacrylate per mol of triblock bipolymer functionalized with secondary amine. The reaction mixture was heated under reflux for 6 hours, after which the mixture was filtered and the solvent removed under reduced pressure to afford the desired product as a viscous liquid.

Evaluation of the PEO$_w$-PPO$_y$-PEO$_w$ Functionalized Triblock Bipolymers as Dehydrating Agents in Crude Oils with API Densities from 3 to 40° API.

Different solutions of each of the synthesized PEO$_w$-PPO$_y$-PEO$_w$ triblock bipolymers with amphoteric endings were made at concentrations within 5 to 40 wt %, employing solvents with a boiling point from 35 to 200° C., such as dichloromethane, methanol, ethanol, isopropanol, chloroform, benzene, toluene, xylene, naphtha, either individually or as blend, so that small volumes of the dissolution were added, avoiding the influence of the solvent on the water removal of tested crude oil. The PEO$_w$-PPO$_y$-PEO$_w$ triblock bipolymers with amphoteric endings were evaluated at concentrations from 100 to 2000 ppm. The triblock bipolymers were evaluated simultaneously, as a comparison, with the FDH-1 commercial dehydrating formulation widely used in the petroleum industry.

In Table 1 summarizes the block polymers of type polyether (basics) that constitute the FDH-1 commercial formulation. It must be highlighted that each polymer confers to the FDH-1 formulation a specific property, either as breaker of the emulsion, coalescer of the water droplets or clarifier of the aqueous phase. In contrast, the PEO$_w$-PPO$_y$-PEO$_w$ amphoteric triblock bipolymers are only a single polymer that do not need to be combined, since each single amphoteric triblock bipolymer molecule possesses all the demulsifying properties (breaker, coalescer, and clarifier).

TABLE 1

Components comprising the FDH-1 commercial formulation, including average molecular mass in number ($\overline{M_n}$) and PPO/PEO composition (wt %).
FDH-1 formulation

| Keyname | ($\overline{M_n}$) g · mol$^{-1}$ | Composition wt % |
|---|---|---|
| TP 89 | 7,750 | 90/10 |
| TP 03 | 5,330 | 70/30 |
| TP 14 | 3,050 | 60/40 |
| TP 71 | 1,400 | 90/10 |

The evaluation procedure of the PEO$_w$-PPO$_y$-PEO$_w$ amphoteric triblock bipolymers is a follows: 100 mL of the corresponding crude oil was added in graduated oblong bottles provided with a cover. Then, an aliquot of the respective dissolution of one of the triblock PEO$_w$-PPO$_y$-PEO$_w$ amphoteric triblock bipolymers or the FDH-1 commercial product was dosed. One of the bottles was dosed with an aliquot of xylene, which was labeled as blank. All the bottles were placed in a temperature-controlled water bath at a temperature of 80° C., (t=zero). The readings of removed water of all the bottles was carried out every 5 minutes during the first hour; afterwards, each hour, throughout the evaluation time (5 hours).

The physicochemical characteristics of the employed crude oils in the evaluation of the performance of the PEO$_w$-PPO$_y$-PEO$_w$ amphoteric triblock bipolymers as dehydrating agents are listed in Table 2, whereas in Table 3 reports the weight distribution of the SARA fractions of the crude oils.

FIGS. 1 to 7 represent non-limiting example of the herein described tests.

In FIG. 1 is observed the performance of the amphoteric triblock bipolymers at a dosage of 1500 ppm in the Kawil-1 crude oil (7.55° API). The C-2CEA, C-AA, and C-AMA amphoteric triblock bipolymers came to removing the 100 vol % of emulsified water. However, the C-2CEA bipolymer exhibited the highest coalescence rate, reaching the aforesaid efficiency at 90 min of the assessment; the C-AA bipolymer reached its maximum efficiency at 240 min and, lastly, the C-AMA bipolymer made it up to the 300 min. It is important to note that the presence of a methyl group in the acrylic derivative provokes a decrease in the performance of the amphoteric bipolymer as coalescer. Concerning the C-DEA bipolymer (functionalized with secondary amine), it also removed the total amount of emulsified water, but up to the 300 min. The bipolymer without functionalization (CFS) came to removing 77 vol % of the emulsified water, while the FDH-1 commercial formulation barely removed 64 vol %. Finally, no water removal was observed in the blank, hereby demonstrating that the water-in-crude oil emulsion was colloidally stable. Therefore, the use of triblock bipolymers with amphoteric endings enhances the performance in the water removal, obtaining the best result with 2-carboxyethyl acrylate.

Figure 2:
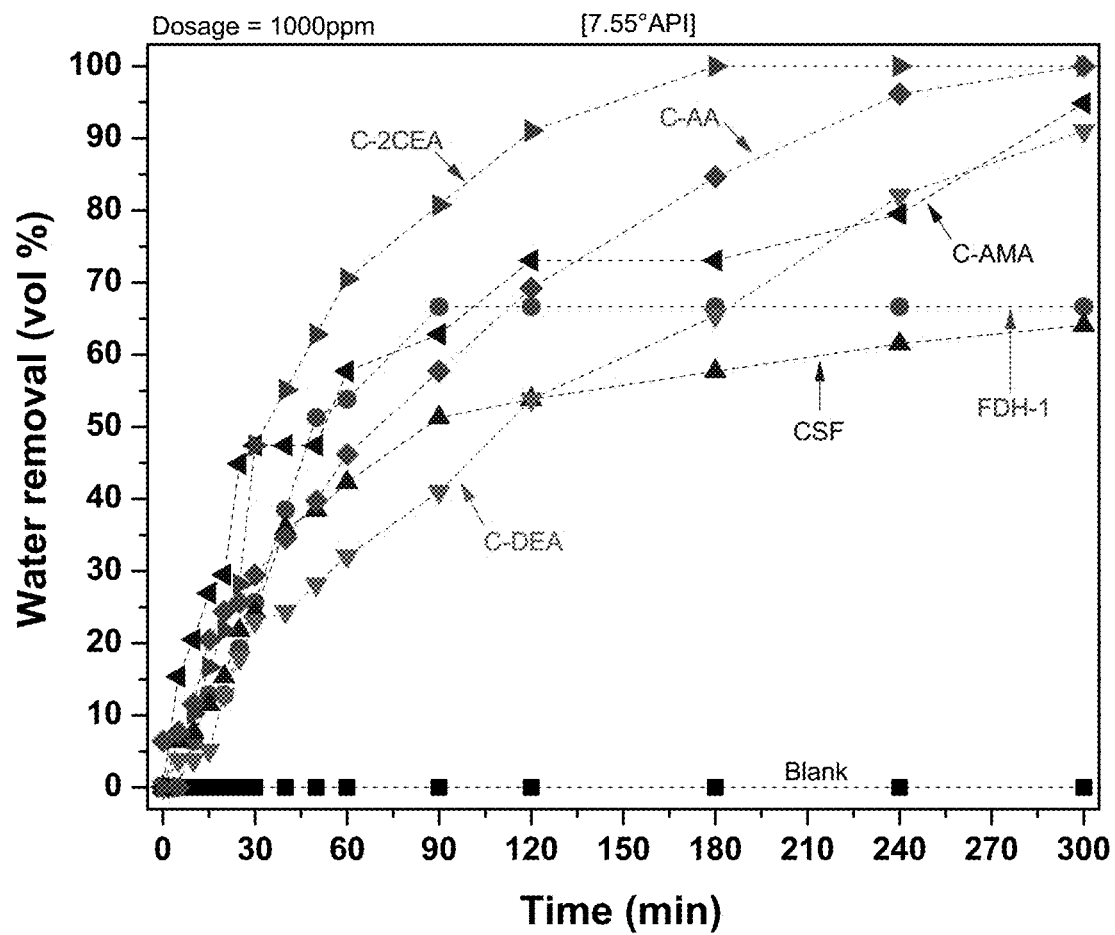
Figure 4:
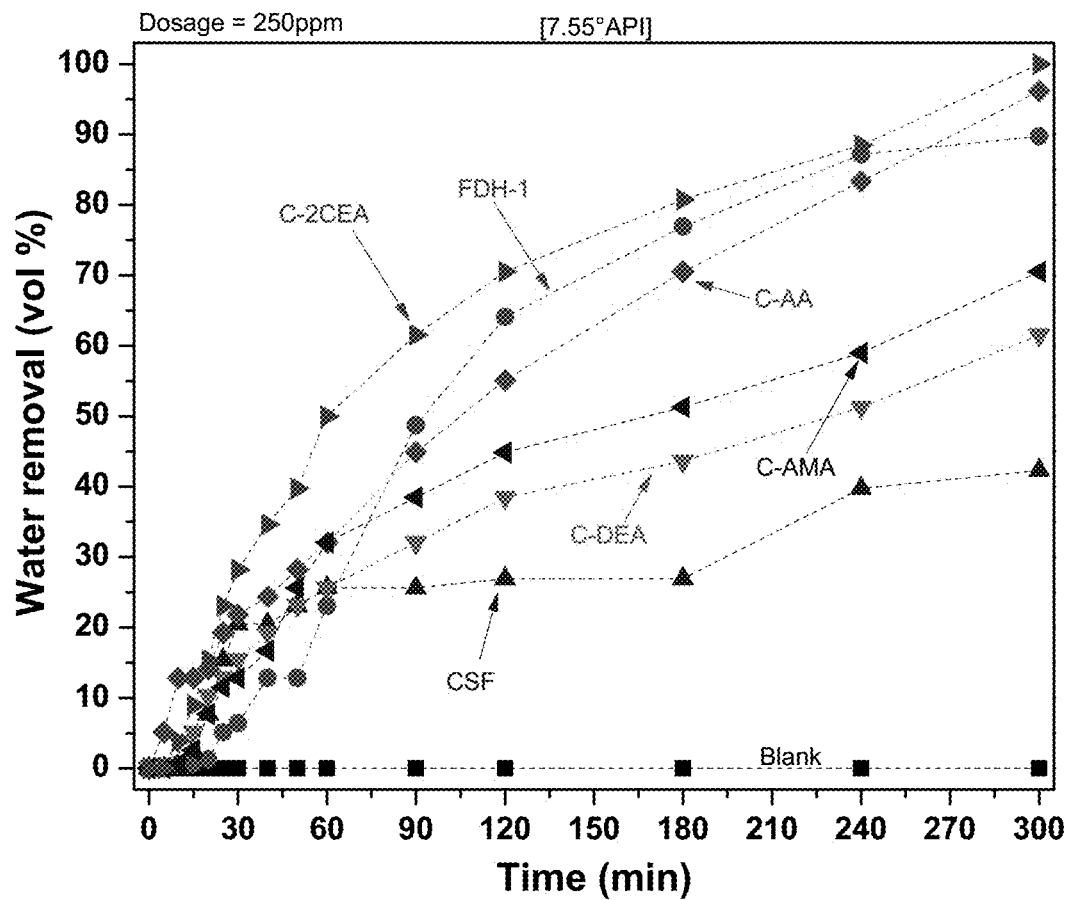

FIG. 2 shows the behavior of the $PEO_w$-$PPO_y$-$PEO_w$ triblock bipolymers with amphoteric endings dosed at 1000 ppm in the Kawil-1 crude oil (7.55° API). The C-2CEA bipolymer proved to be the best demulsifying agent; however, it displayed a low coalescence rate, removing the 100 vol % of water up to the 180 min of the assessment (FIG. 4). The C-AMA and C-DEA bipolymers displayed a good performance as demulsifying agents, removing 95 and 91 vol %, respectively. Regarding the FDH-1 commercial formulation, it reached a maximum efficiency of 67 vol % up to the 90 min, which remained constant throughout the whole evaluation. Finally, the CSF bipolymer withdrew 64 vol % of the emulsified water. It must be noted that the emulsion without demulsifying agent (blank) was stable throughout the evaluation.

TABLE 2

Physicochemical characterization of the crude oils that were submitted to dehydration.

| Property | Kawil-1 | Kawil-2 |
| --- | --- | --- |
| Density (° API) | 7.55[a] | 11.23 |
| Salt content (lb · mbb$^{-1}$) | 42176[b] | 40529 |
| Paraffin content (wt %) | 0.91 | 1.59 |
| Pour temperature (° C.) | +24 | −33.0 |
| Distilled water (vol %) | 78.0 | 49.8 |
| Water and sediments (vol %) | 79.0 | 45.0 |
| Kinematic viscosity (mm$^2$/s) @ 25° C. | —[c] | 753.6 |
| Crioscopy MM (g · mol$^{-1}$) | 1129 | 534 |
| Osmometry MM (g · mol$^{-1}$) | 1375 | 966 |

[a]Dry crude oil of 10.80° API.
[b]Out of method.
[c]Undetermined by the specified method.

TABLE 3

SARA analysis of the crude oils that were submitted to dehydration.

| Fraction | Kawil-1 | Kawil-2 |
| --- | --- | --- |
| Saturates (wt %) | 20.35 | 25.02 |
| Aromatics (wt %) | 36.17 | 44.60 |
| Resins (wt %) | 26.43 | 21.01 |
| Asphaltenes (wt %) | 16.95 | 9.26 |

Figure 3:
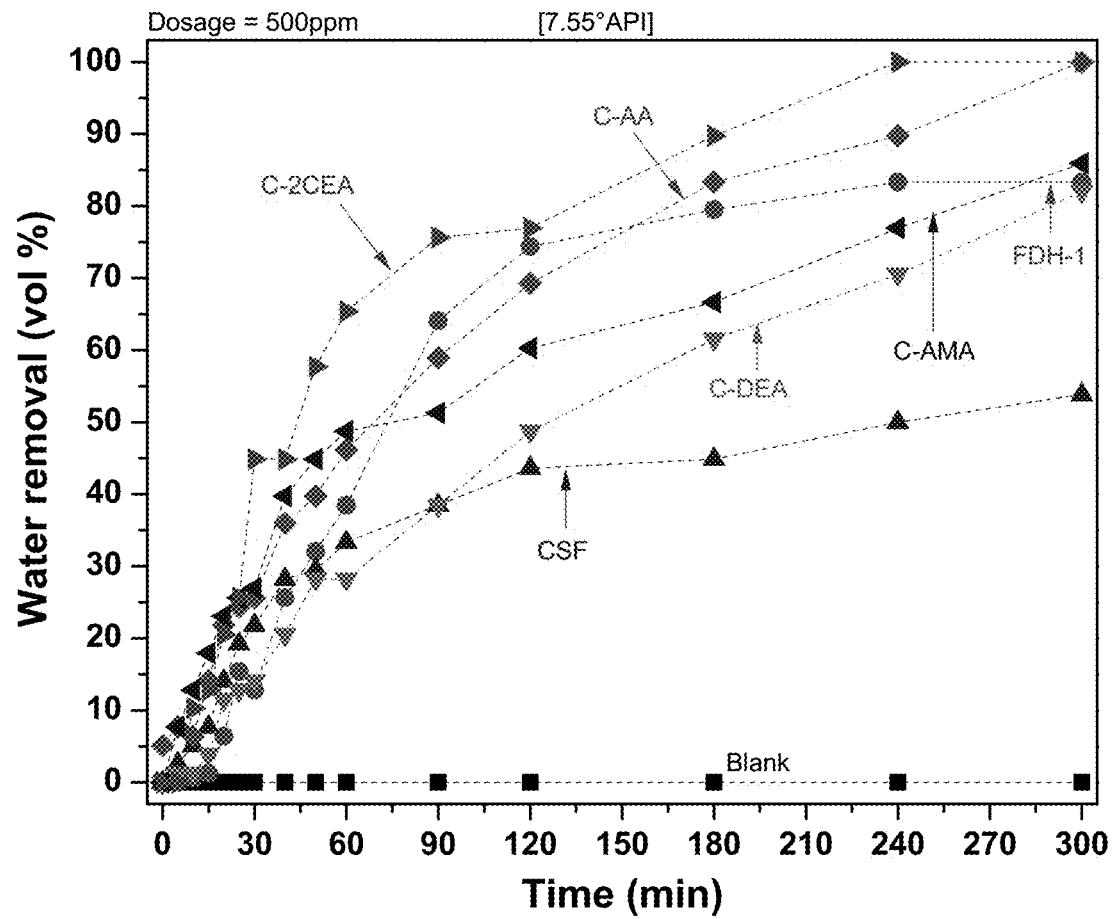

FIG. 3 displays the performance of the $PEO_w$-$PPO_y$-$PEO_w$ triblock bipolymers with amphoteric endings at a dosage of 500 ppm, in the Kawil-1 crude oil (7.55° API). The C-2CEA and C-AA bipolymers demonstrated to be the most efficient demulsifying agents, removing the total amount of emulsified water at 240 and 300 min, respectively. The FDH-1 commercial formulation disclosed a better performance as demulsifier at this dosage, removing 83 vol % of the emulsified water. Even though the C-AMA bipolymer exhibited a lower coalescence rate than the FDH-1 formulation; however, it displayed a better performance at the end of the evaluation, removing 86 vol %. Concerning C-DEA bipolymer, it reached an efficiency of 82 vol % of removed water. Finally, the bipolymer without functionalization scarcely withdrew 54 vol % of water.

Figure 6:
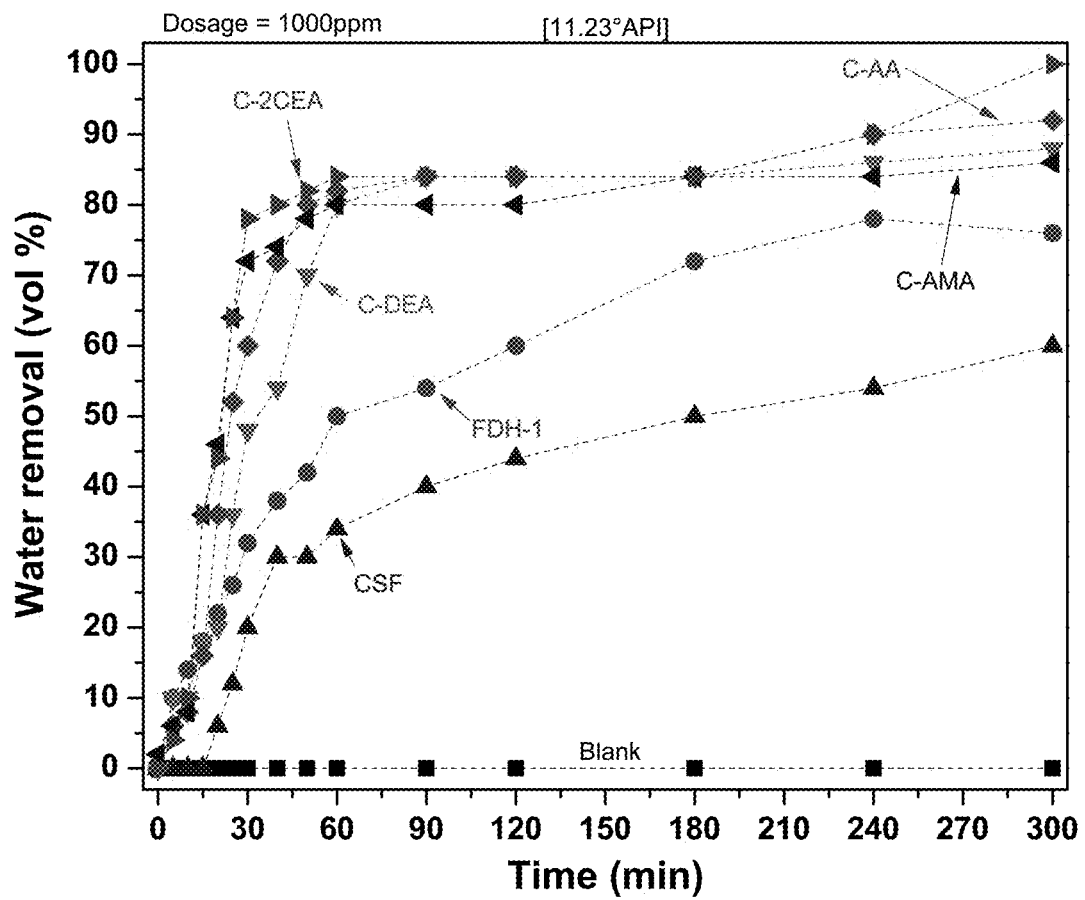

FIG. 4 reports the performance of the $PEO_w$-$PPO_y$-$PEO_w$ triblock bipolymers with amphoteric endings in the Kawil-1 crude oil (7.55° API) at a dosage of 250 ppm. The C-2CEA demulsifying agent was the only bipolymer able to remove the total amount of water, requiring 300 min to do it. The FDH-1 commercial formulation displayed a better performance compared with that at higher dosages, removing 90 vol % of water (FIG. 6). The C-AA bipolymer presented a lower performance than that of the commercial product after 90 min of the evaluation; nonetheless, it achieved to remove 96 vol % at the end of the test. The efficiency of the C-AMA and C-DEA bipolymers diminished compared with their performances at dosed of 500 ppm, barely removing 71 and 62 vol %, respectively. The performance of the non-functionalized bipolymer significantly decreased, reaching an incipient efficiency of 42 vol %.

Figure 5:
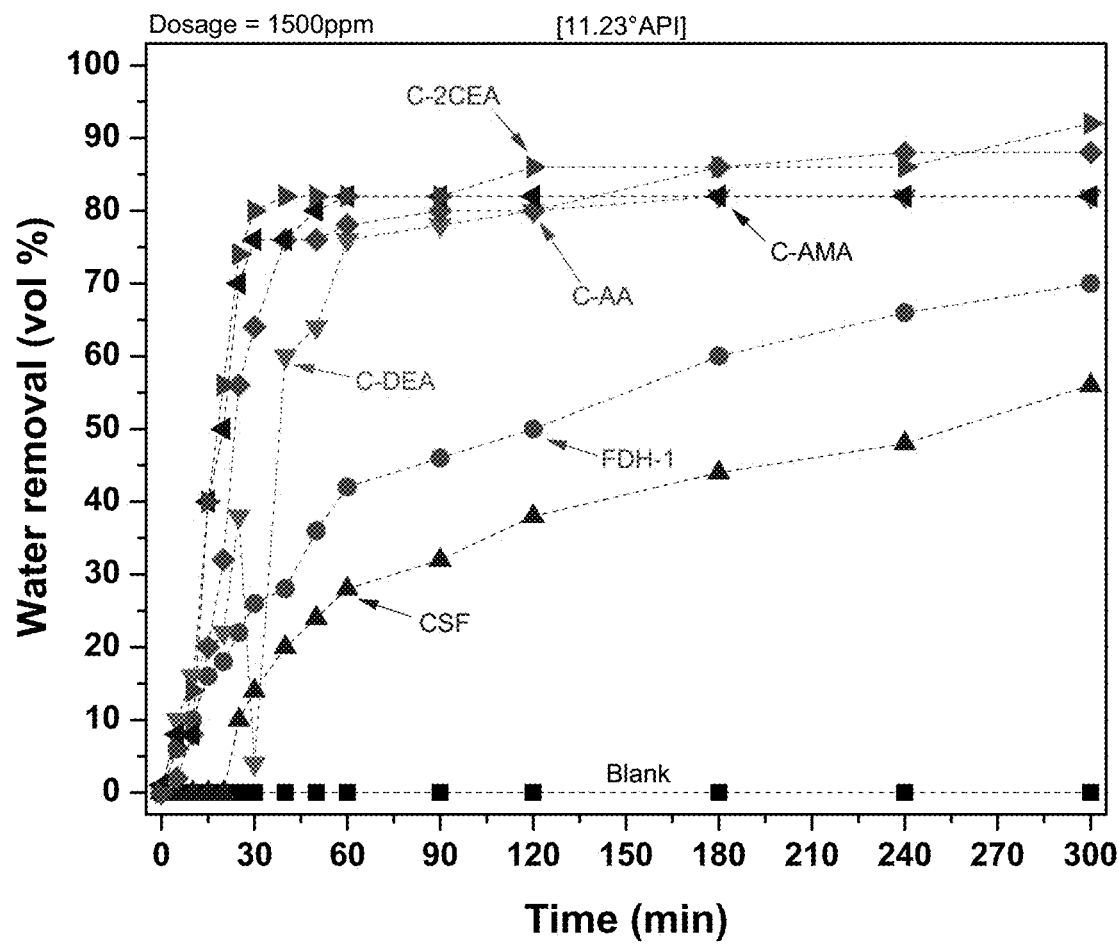

FIG. 5 exhibits the behavior of the $PEO_w$-$PPO_y$-$PEO_w$ triblock bipolymers with amphoteric endings in the Kawil-2 crude oil (11.23° API) at a dosage of 1500 ppm. The C-2CEA bipolymer showed the highest water removal efficiency, removing 92 vol %. The C-AA bipolymer showed to remove 88 vol % of water, while the C-AMA and C-DEA bipolymers displayed the same water removal efficiency, 82 vol %. The FDH-1 commercial formulation presented a lower efficiency, reaching 70 vol %. Finally, the CSF bipolymer only removed 56 vol % of the emulsified water. It should be highlighted that there was no water removal in the blank, hence, the water-in-crude oil emulsion was colloidally stable.

FIG. 6 reports the performance of the triblock $PEO_w$-$PPO_y$-$PEO_w$ bipolymers with amphoteric endings in the Kawil-2 crude oil (11.23° API) at a dosage of 1000 ppm. The bipolymers displayed a better performance compared with their behavior at a higher dosage (1500 ppm). In this evaluation, the C-2CEA bipolymer removed the total amount of water at the end of the test. 100 vol %, whereas the C-AA bipolymer reached to eliminate 92 vol % of emulsified water. C-DEA bipolymer presented an efficiency of 88 vol %, being slightly greater than the one obtained by C-AMA bipolymer, 86 vol %. The commercial formulation could withdraw 78 vol %, while the bipolymer without functionalization, CSF, barely removed 60 vol % of emulsified water.

Figure 7:
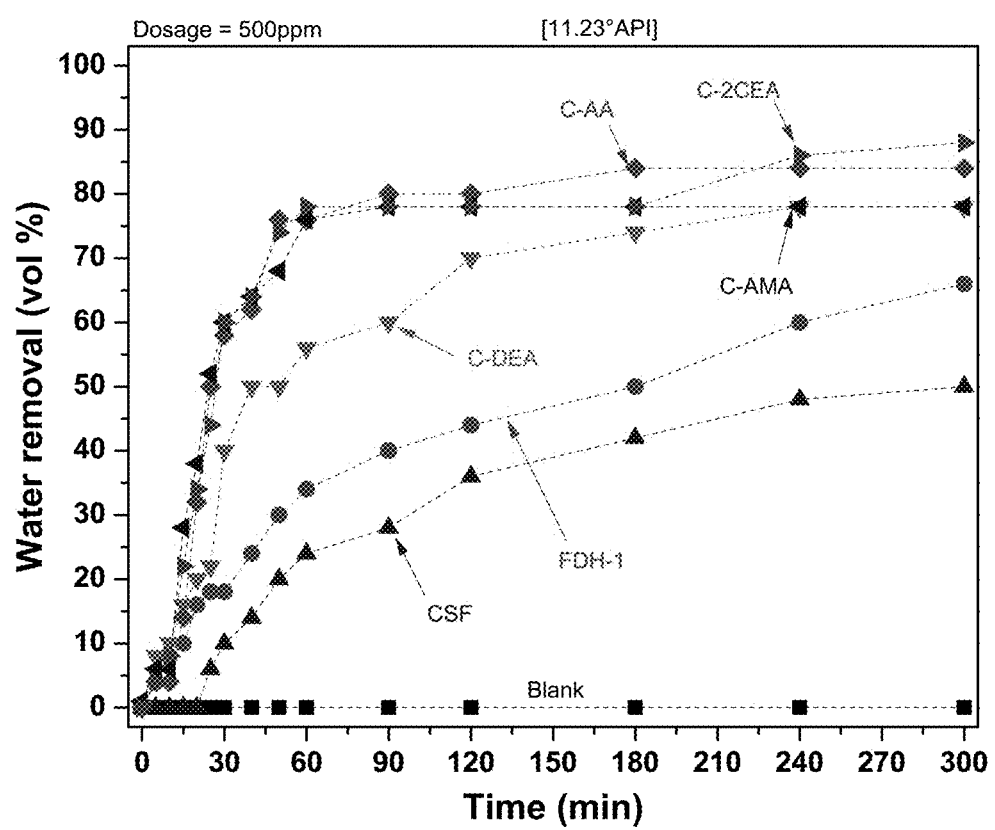

FIG. 7 displays the efficiency of the $PEO_w$-$PPO_y$-$PEO_w$ triblock bipolymers with amphoteric endings in the Kawil-2 crude oil (11.23° API) at a dosage of 1000 ppm. The major water removal efficiency, 88 vol %, was obtained by the C-2CEA bipolymer. The C-AMA and C-DEA bipolymers displayed the same water removal efficiency, 78 vol %. On the other hand, the FDH-1 commercial formulation scarcely eliminated 66 vol %; whereas the non-functionalized bipolymer, CFS, barely removed 50 vol % of water.

BIBLIOGRAPHIC REFERENCES

[1] Industrial Chemical Engineering thesis, Instituto Politécnico Nacional (IPN)—Escuela Superior de Ingenieria Quimica e Industrias Extractivas (ESIQIE), November 2008, pp 2, 20-22, 40-47, "Synthesis, characterization and evaluation of block copolymers for mexican crude oils dehydration", Arnulfo Hernández Garcia.
[2] U.S. Pat. No. 2,425,845, Aug. 19, 1947, "Mixtures of polyoxyalkylene diols and methods of making such mixtures", Toussaint and Fife.
[3] U.S. Pat. No. 3,334,038, Aug. 1, 1967, "Phase separation process", R. N. Lucas.
[4] Colloids and Surfaces A: Physicochemical and Engineering Aspects 252 (2005) 79-85, "*Effect of EO and PO positions in nonionic surfactants on surfactant properties and demulsification performance*", J. Wu et al.
[5] U.S. Pat. No. 8,815,960, Aug. 26, 2014, "Demulsifying and dehydrating formulations for heavy crude oils based on block copolymers bifunctionalized with amines", G. Cendejas et al.
[6] U.S. Pat. No. 9,587,182, Mar. 7, 2017, "Synergistic formulations of functionalized copolymers and ionic liquids for dehydrated and desalted of medium, heavy and extra heavy crude oils", Flores-Oropeza et al.
[7] U.S. Pat. No. 9,650,577, May 16, 2017, "Synergistic formulations of functionalized copolymers and ionic liquids for dehydrated and desalted of medium, heavy and extra heavy crude oils", Flores-Oropeza et al.
[8] U.S. Pat. No. 9,745,521, Aug. 29, 2017, "Dehydrating and desalting compositions of crude oils, using triblock copolymers α,ω-bifunctionalized with amines", Flores-Oropeza et al.
[9] U.S. Pat. No. 9,752,084, Sep. 5, 2017, "Block copolymers, synthesis and application as dehydrating and desalting of heavy crudes.", Flores-Oropeza et al.
[10] U.S. Pat. No. 10,125,226, Nov. 13, 2018, "Scale-up process of bifunctionalized triblock copolymers with secondary and tertiary amines, with application in dewatering and desalting of heavy crude oils.", Flores-Sandoval et al.
[11] U.S. Pat. No. 9,023,785 B2, May 5, 2015, "Gemini surfactants, process of manufacture and use as multifunctional corrosion inhibitor.", Hernandez-Altamirano et al.
[12] CN Patent 2970268, Jun. 16, 2016, "Hydroxysultaine- and sulfobetaine-based geminal zwitterionic liquids, method for obtaining same, and use thereof as wettability modifiers having corrosion inhibiting properties" Hernandez-Altamirano et al.

What is claimed is:

1. $PEO_w$-$PPO_y$-$PEO_w$ triblock bipolymers, having amphoteric end groups, having at least one of Formulas (2) and (3)

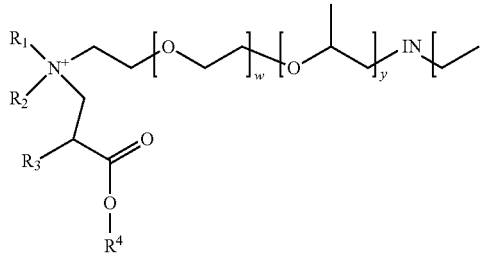

Formula (2)

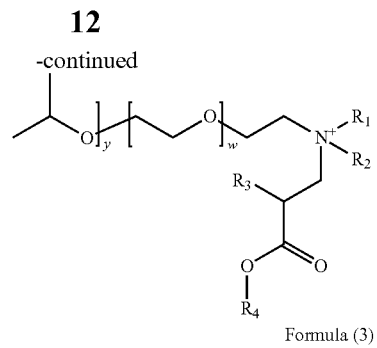

Formula (3)

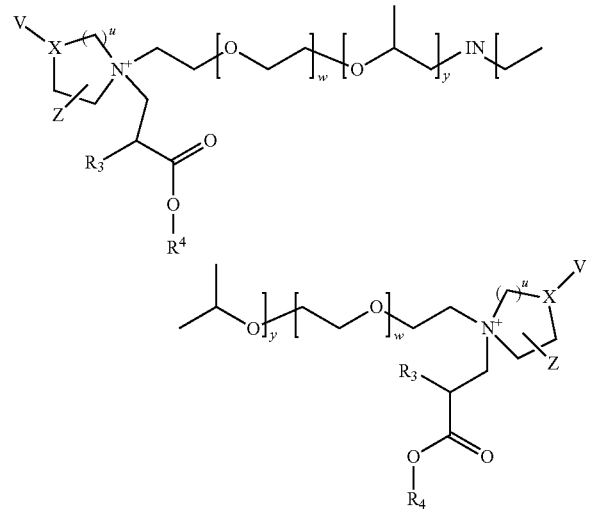

Where:
IN=$C_2H_4O_2$ (ethylene glycollate)
$R_1$ and $R_2$=independent radicals represented by the groups:
—H (hydrogen); —$CH_2(CH_2)_AB$; -CEGJ; —$CH_2CHLM$; —$CH_2(CH_2)_QM$;
where A is an integer from 1 to 11 and B is —H,
EGJ are independent radicals represented by: —H, -methyl, ethyl, n-propyl, iso-propyl, sec-butyl, iso-butyl, tert-butyl, n-butyl, phenyl, cyclohexyl, cyclopentyl,
L is a radical representing methyl and ethyl, and M is a hydroxyl group,
Q is an integer from 1 to 5; T is representing groups: EGJ and $NO_2$, Cl, F, Br,
$R_3$=H (hydrogen), $CH_3$ (methyl), methoxide ($CH_3O$),
$R_4$=H (hydrogen), $CH_3$ (methyl), $C_3H_5O_2$ (carboxyethyl), $C_4H_7O_2$ (carboxypropyl) and $C_5H_9O_2$ (carboxybutyl), $C_2H_4O$ (ethoxy), $C_4H_8O$ (butoxy),
U is an integer from 1 to 2;
X represents oxygen or nitrogen atoms; with the proviso that when X=nitrogen then V is represented by methyl, ethyl, n-propyl, iso-propyl, sec-butyl, iso-butyl, tert-butyl, n-butyl, phenyl, cyclopentyl or benzyl,
Z represents a mono- or di-substitution at any ring position of 5- or 6-member rings, chosen from methyl, ethyl, n-propyl, iso-propyl, sec-butyl, iso-butyl, tert-butyl, n-butyl, phenyl, cyclohexyl, cyclopentyl, benzyl or hydroxyl,
w is an integer from 4 to 90,
y is an integer from 6 to 104,
wherein the $PEO_w$-$PPO_y$-$PEO_w$ triblock bipolymers are demulsifying agents capable of removing water dispersed in crude oils, wherein the crude oils have an API density from 3 to 40° API; and wherein the triblock biopolymers have number average molecular weight from 600 to 10,000 g/mol.

2. $PEO_w$-$PPO_y$-$PEO_w$ triblock bipolymers with amphoteric end groups, according to claim 1, comprising one or more secondary amines chosen from: 1-ethylpropylamine, (2,2-dimethylpropyl)(methyl)amine, N-methyl-N-(1-phenylethyl)amine, bis(2-ethylhexyl)amine, N-benzyl-N-(2-methoxyethyl)amine, diisopropylamine, 2-(methylamino)-ethanol, 2-(butylamino)-ethanol, 2-(benzylamino)-ethanol, 2-(cyclohexylamino)-ethanol, 2-(tert-butylamino)-ethanol, 2-(phenylamino)-ethanol, 2-(n-propylamino)-ethanol, 2-(iso-propylamino)-ethanol, 2-(hydroxymethylamino)-ethanol, 2,2'-iminodiethanol, 1,1'-iminodi-2-propanol, 4-(butylamino)-1-butanol, 1-benzylpiperazine, 1-phenylpiperazine, 2-(hexylamino)-ethanol, 1-(ortho-chlorophenyl)-piperazine, 1-ethylpiperazine, 1-(meta-tolyl)-piperazine, 1-(4-nitrophenyl)-piperazine, 4-benzylpiperidine, 4-methylpiperidine, 2-methylpiperidine, 2-ethylpiperidine, 3,5-dimethylpiperidine, piperidine-3-ol, piperidine-4-ol, trans-3,5-dimethylpiperidine, cis-3,5-dimethylpiperidine, 3-methylpiperidine, piperidine-3-ilmethanol, 3,3-dimethylpiperidine, 4-phenylpiperidine-3-ol, 4-phenyl-piperidine, 4-(piperidin-4-yl)morpholine, 4,4'-bipiperidine, pyrrolidin-3-amine, 2,6-dimethylmorpholine, morpholine, pyrrolidin-2-ylmethanol, trans-2,5-dimethylpyrrolidine, cis-2,5.dimethylpyrrolidine, diphenylamine, 2-nitro-diphenylamine, 4-nitro-diphenylamine, pyrrolidine, 4,4'-bis(dimethylamino)-diphenylamine, 2,4-dinitro-diphenylamine, 4,4'-dimethoxy-diphenylamine, diethylamine, dipropylamine, dibutylamine, dipentylamine, dihexylamine, dioctylamine, didecylamine, didodecylamine, dinonylamine, N-methylhexylamine, di-iso-propylamine, N-iso-propyl-tert-butylamine, N-ethyl-tert-butylamine, N-ethyl-butylamine, di-iso-butylamine, iso-butyl-sec-butylamine, di-iso-pentylamine, ethyl-n-dodecylamine, di-tert-amyl-amine, N-methyl-pentylamine, N-methyl-butylamine, N-methyl-tert-butylamine, N-ethyl-iso-propylamine, N-ethyl-propylamine, N-methyl-octylamine, piperidine.

3. $PEO_w$-$PPO_y$-$PEO_w$ triblock bipolymers with amphoteric end groups, according to claim 2, prepared using a Michael addition carried out by dissolving a functionalized bipolymer having a secondary amine end cap in an organic solvent, having a boiling point from 40 to 130° C., the solvent selected from methanol, ethanol, isopropanol, chloroform, benzene, toluene or xylene, or mixtures thereof.

4. $PEO_w$-$PPO_y$-$PEO_w$ triblock bipolymers with amphoteric end groups, according to claim 1, prepared using a Michael reactions carried out using carboxyacrylic derivatives chosen from 2-carboxyethyl acrylate, 3-carboxypropyl acrylate, 4-carboxybutyl acrylate, 2-carboxyethyl methacrylate, 3-carboxypropyl methacrylate and 4-carboxybutyl methacrylate.

5. $PEO_w$-$PPO_y$-$PEO_w$ triblock bipolymers with amphoteric end groups, according to claim 4, where the Michael reaction is performed using a molar ratio of functionalized bipolymer to carboxyacrylic derivative from 1.0:2.0 to 1.0:3.0.

6. $PEO_w$-$PPO_y$-$PEO_w$ triblock bipolymers with amphoteric end groups, according to claim 5, where the Michael reaction is carried out adding the acrylic derivative under reagent starving conditions at a mass flow rate between 1 and 50 $g \cdot min^{-1}$.

7. $PEO_w$-$PPO_y$-$PEO_w$ triblock bipolymers with amphoteric end groups, according to claim 6, where the Michael reaction is conducted at a temperature of from about 50 to about 120° C.

8. $PEO_w$-$PPO_y$-$PEO_w$ triblock bipolymers with amphoteric end groups, according to claim 7, where the Michael reaction for a period of from 2 hours to 8 hours.

9. $PEO_w$-$PPO_y$-$PEO_w$ triblock bipolymers with amphoteric end groups, according to claim 8, wherein once the reaction is complete the solvent is removed at a temperature from 80 to 130° C.

10. A dehydrating agent for crude oils, comprising at least one of the $PEO_w$-$PPO_y$-$PEO_w$ triblock bipolymers with amphoteric end groups according to claim 1, dissolved in an organic solvent.

11. The dehydrating agent for crude oils according to claim 10, where the organic solvent is selected from dichloromethane, methanol, ethanol, isopropanol, chloroform, benzene, toluene, xylene, or mixtures thereof.

12. The dehydrating agent for crude oils according to claim 10, wherein the bipolymer is present in a concentration from 10 to 50 wt %.

13. A method of using the dehydrating agent according to claim 10, comprising the step of dosing the dehydrating agent at a concentration from 10 to 2,000 ppm.

* * * * *